United States Patent Office 3,534,044
Patented Oct. 13, 1970

3,534,044
PROCESS FOR PRODUCING BETA-QUINACRIDONES
Robert Glenn Fessler, Martinsville, and Philip Randolph Ruby, Millington, N.J., assignors to American Cyanamid Company, Stamford, Conn., a corporation of Maine
No Drawing. Filed Jan. 10, 1967, Ser. No. 608,275
Int. Cl. C07d 37/00
U.S. Cl. 260—279                                      4 Claims

ABSTRACT OF THE DISCLOSURE

A process of making linear quinacridone pigments in the beta crystal phase by milling a linear quinacridone of random or unspecified phase in the presence of an inorganic salt and formic, acetic, acrylic, or substituted acetic acids until the beta phase crystal modification is obtained.

---

This invention relates to a novel process for producing quinacridone of the "beta" crystal form. More particularly, it relates to a novel process for producing "beta" phase quinacridone which comprises milling a crude linear quinacridone of any of various polymorphic forms in the presence of an inorganic salt and a monobasic organic acid.

A number of grinding or milling procedures for preparing quinacridones in pigmentary form have been employed or proposed. Many of these procedures are not intended to and/or do not involve polymorphic conversions. While certain known procedures involve simultaneous particle size reduction and crystal phase conversion, they are beset with certain deficiencies. Thus, "beta" phase quinacridone can be obtained by salt milling crude quinacridone of various forms. However, the salt milling procedure requires unduly long grinding times and the size of the pigment load capable of being charged into the mill is limited because of slow conversion rate. Moreover, shade control is difficult because of the varying time of milling necessitated by variations in grinding media.

There exists, therefore, the need for an improved milling process which is capable of producing pigmentary quinacridone from various crudes in relatively short grinding times, allowing for more economical use of mill capacity and permitting close shade control of the milled product.

It has now been discovered that when "crude" quinacridone material is milled with a relatively large amount of salt and in the presence of certain monobasic acids, pigmentary quinacridone of the beta phase is advantageously produced. Only certain organic carboxylic monobasic acids accomplish this desired result and surprisingly corresponding dibasic acids are ineffective.

Thus, using the process of the invention, the conversion is effected in a much shorter time than with use of costly solvents in high quantities. More economic use of equipment capacity is attained since larger batches may be charged than was feasible with known milling processes intended to give the same result.

The present invention is useful for converting crude coarse linear quinacridone of random crystalline phases such as can be obtained by the processes of U.S. Pats. 2,844,581 and 2,844,484. The quinacridone starting material is mixed with an inorganic salt and an organic carboxylic monobasic acid and the mixture milled until the quinacridone is converted to pigmentary beta-linear quinacridone. The type of salt used in the process of this invention is not especially critical. Sodium chloride is preferred because of low cost and ready availability, but other salts soluble in water or dilute acid such as potassium chloride, anhydrous sodium sulfate, ammonium chloride, ammonium sulfate and calcium chloride may be used with equally good results. Powdered commercial grades of these salts are most conveniently used. An aqueous extraction after ball-milling is necessary to remove the salt and the presence of added sulfuric acid insures the removal of any particles of metal which may be abraded from the mill or grinding balls. The ratio of about 9 parts of salt to 1 part of pigment has proved to be a preferred ratio for satisfactory results, but the ratio may be varied widely from as little as about 4 parts of salt up to 15–20 parts with only minor influence on the results. The lower amounts require longer mill cycles, while the large amounts offer no advantage and are thus uneconomical.

The conventional use of salt-mills is shown in patents such as 3,201,051, Manger and Perkins, Aug. 17, 1965; and the conventional use of water-soluble inorganic salts as grinding aids in 3,176,925, Huband and Mitchell, Apr. 6, 1965.

The monobasic organic carboxylic acids that may be employed in the present invention are limited to formic acid, acetic acid, substituted acetic acids and acrylic acid. Among the substituted acetic acids are included haloacetic acid (e.g., chloroacetic acid), arylacetic acids (e.g., phenylacetic acid) and the like. The acid may be used at a concentration of from about 10% to about 50% or more based on the weight of the crude quinacridone present. Particularly good results are obtained with 25% of acid based on the crude quinacridone. Lesser amounts generally require longer milling times for complete conversion while larger amounts offer no advantage and thus are uneconomical. (It is to be noted that the amount of acid required compares favorably with the amount of the conventional solvents which are employed in known conversion processes.)

Any mill which grinds by shearing and attrition is suitable, e.g., a roller mill or an edge-runner mill or a ball mill. The latter is the preferred apparatus. The optimum time will vary with the size of the mill, and is easily determined by the skilled operator for any given mill and for the specific shade control desired.

After milling, the charge is removed from the mill, separated from the grinding media, and the pigment is isolated by dissolving out the water-soluble salt and acid, or where an insoluble acid is present, by continued flushing of the pigment. In the latter case, small amounts of alkali in the flushing water will expedite the acid removal. Sulfuric acid will also aid in the removal of the more insoluble acids, especially if followed by a neutralization step. The washed pigment thus obtained is dried at convenient temperature, generally from about 60–75° C. in a circulating hot air oven to give the desired beta phase linear quinacridone pigment.

The invention is more fully illustrated by the examples which follow.

EXAMPLE 1

To a one-gallon ball mill is charged 9600 parts of a grinding media (¼" steel shot), 45 parts of crude linear quinacridone in the alpha phase, 400 parts of NaCl, and 11.5 parts of glacial acetic acid. The mill is rolled at 70% of its critical speed and within 18 to 24 hours essentially complete conversion to pigmentary beta phase linear quinacridone is effected as indicated by infra-red examination of the separated product.

The starting material is obtained by treating 2,5-dianilinoterephthalic acid with polyphosphoric acid, followed by drowning the reaction mixture in water.

The foregoing procedure is similarly capable of giving beta-phase quinacridone starting with quinacridone of the gamma phase.

EXAMPLE 2

The process of Example 1 was repeated except that the glacial acetic acid was replaced by 11.5 parts of xylene.

The time for essentially complete conversion to beta form linear quinacridone was 72 hours.

EXAMPLE 3

The process of Example 1 was repeated except that the glacial acetic acid was replaced by 11.5 parts of chloroacetic acid. Similar results were obtained as in Example 1.

EXAMPLE 4

Same as Example 1 except for the substitution of 11.5 parts of formic acid for the glacial acetic acid with similar results.

EXAMPLE 5

Same as Example 1 except for the substitution of 11.5 parts of acrylic acid for the glacial acetic acid with similar results.

EXAMPLE 6

Same as Example 1 except for the substitution of 11.5 parts of phenylacetic acid for the glacial acetic acid with similar results.

EXAMPLE 7

Same as Example 1 except for the substitution of 11.5 parts of propionic acid for the glacial acetic acid. The pigmentary quinacridone obtained was not of the beta phase. Thus, propionic acid did not meet the requirements of this invention for a monobasic carboxylic acid which is capable of inducing the formation of beta phase linear quinacridone.

EXAMPLE 8

Same as Example 1 except for the substitution of 11.5 parts of succinic acid for the glacial acetic acid. The pigmentary quinacridone obtained was not of the beta phase.

EXAMPLE 9

The procedure of Example 1 was followed except that double the pigment load was employed. After 36 hours of grinding, a pigmentary quinacridone of the beta phase was obtained which was equal in properties to that of Example 1. This experiment shows that the acid milling of the present invention allows increased loading of the mills while still obtaining the desirable pigment in half the time required for grinding by conventional procedures as typified by Example 2.

We claim.

1. The process for producing beta crystal phase linear quinacridone pigment which comprises:
   salt-milling crude linear quinacridone of randomly chosen crystalline phases in the presence of
   from about 4 to 20 parts of an inorganic chloride or sulfate salt grinding aid which is soluble in both water and dilute acid, and
   from about 0.1 to 0.5 part of a monobasic organic acid selected from the group consisting of formic, acetic, acrylic and substituted acetic acids having halo or phenyl substitutents per part of quinacridone,
   in a salt-mill which grinds by shearing and attrition, until the quinacridone is changed to beta phase crystal form and pigmentary size,
   then separating the said salt and said acid from the beta crystal phase quinacridone pigment.

2. The process of claim 1 in which the salt-mill is a ball mill.

3. The process of claim 1 in which the acid is acetic acid.

4. The process of claim 3 in which the salt is sodium chloride.

References Cited

UNITED STATES PATENTS

| | | | |
|---|---|---|---|
| 2,840,568 | 6/1958 | Brouillard et al. | 106—288 |
| 2,982,666 | 5/1961 | Chun | 260—279 |
| 3,030,370 | 4/1962 | Jackson et al. | 260—279 |
| 3,148,191 | 9/1964 | Jackson et al. | 260—279 |
| 3,176,925 | 5/1965 | Huband et al. | 260—279 |
| 3,201,051 | 8/1965 | Manger et al. | 241—22 |
| 3,288,621 | 11/1966 | Barron et al. | 260—279 X |
| 3,336,147 | 8/1967 | Mitchell et al. | 106—288 |
| 3,372,184 | 3/1968 | Auster | 260—279 X |

DONALD G. DAUS, Primary Examiner